(12) United States Patent
Xu et al.

(10) Patent No.: US 11,179,607 B1
(45) Date of Patent: Nov. 23, 2021

(54) BALL PICKING ROBOT

(71) Applicants: Chongqing Vocational Institute of Engineering, Chongqing (CN); Chongqing University, Chongqing (CN); Hao Xu, Chongqing (CN)

(72) Inventors: Hao Xu, Chongqing (CN); Jiashun He, Chongqing (CN); Jiang Liu, Chongqing (CN); Yifei Xu, Chongqing (CN); Fusheng Pan, Chongqing (CN)

(73) Assignees: CHONGQING VOCATIONAL INSTITUTE OF ENGINEERING, Chongqing (CN); CHONGQING UNIVERSITY, Chongqing (CN); Hao Xu, Chongqing (CN)

( * ) Notice: Subject to any disclaimer, the term of this patent is extended or adjusted under 35 U.S.C. 154(b) by 0 days.

(21) Appl. No.: 17/235,897

(22) Filed: Apr. 20, 2021

(30) Foreign Application Priority Data

Jul. 14, 2020 (CN) .......................... 202010672228.0

(51) Int. Cl.
*A63B 47/02* (2006.01)
*B65G 67/02* (2006.01)

(52) U.S. Cl.
CPC ............ *A63B 47/021* (2013.01); *B65G 67/02* (2013.01); *A63B 2047/022* (2013.01)

(58) Field of Classification Search
CPC .. A63B 47/021; A63B 2047/022; B65G 67/02
See application file for complete search history.

(56) References Cited

U.S. PATENT DOCUMENTS

| | | | | |
|---|---|---|---|---|
| 5,980,392 A | * | 11/1999 | Cox ..................... | A63B 47/021 473/167 |
| 2013/0160415 A1 | * | 6/2013 | Ronning .............. | A01D 43/077 56/13.3 |

FOREIGN PATENT DOCUMENTS

| | | |
|---|---|---|
| CN | 206214688 U | 6/2017 |
| CN | 108436942 A | 8/2018 |
| CN | 207755716 U | 8/2018 |
| CN | 209237277 U | 8/2019 |
| CN | 209286606 U | 8/2019 |
| CN | 209984888 U * | 1/2020 |

* cited by examiner

*Primary Examiner* — Jeffrey S Vanderveen
(74) *Attorney, Agent, or Firm* — Dragon Sun Law Firm, PC; Jinggao Li, Esq.

(57) ABSTRACT

The present invention relates to a ball picking robot, comprising a walking mechanism, a ball picking mechanism, a ball pushing mechanism and a ball storage mechanism. The ball picking mechanism comprises a ball picking basket, an air cylinder used for driving the ball picking basket to move up and down, an air storage tank used for providing an air source for the air cylinder, a solenoid valve arranged at the air outlet of the air storage tank, a micro air pump connected to the air storage tank, and a shielding assembly arranged at an opening in the rear end of the ball picking basket. A first gear is mounted at the input end of the micro air pump. The ball pushing mechanism comprises a rotary ball discharging assembly, comprising an either-rotation motor, a rotary impeller connected to a first output shaft of the either-rotation motor through a belt assembly.

6 Claims, 4 Drawing Sheets

BALL PICKING ROBOT

CROSS-REFERENCE TO RELATED APPLICATION

This application claims priority from the Chinese patent application 202010672228.0 filed Jul. 14, 2020, the content of which are incorporated herein in the entirety by reference.

TECHNICAL FIELD

The present invention relates to the technical field of sports equipment, in particular to a ball picking robot.

BACKGROUND

With the improvement of living standards, ball games such as table tennis, badminton and golf are becoming more and more popular. In the play process, especially when practicing a ball game, it is very common that a lot of balls are hit all over the place. If not picking them up timely, athletes may step on them and get injured resulting from a fall. People usually bend over to pick up a large number of balls scattered on the court with their hands or by a hand-held ball picking tool. Balls have to be repeatedly picked up in the daily training process. However, manual picking wastes time, affects the training efficiency, and requires great labor intensity for ball pickers.

With the progress of science and technology, many ball picking robots have been developed in recent years, but existing ball picking robots generally have some disadvantages such as complex structure, cumbersome operation, low picking success rate, low picking efficiency and the like. Chinese patent CN 110152256A discloses a table tennis ball picking robot and an automatic table tennis ball picking and sorting method. The table tennis ball picking robot collects the scattered table tennis balls together through two ball collection plates arranged under the chassis during walking, and then picks up the table tennis balls located between the two collection plates into a temporary ball storage bin through the rotation of the first rotary impeller. Because table tennis balls are light and rolls easily, they not necessarily enter a space between two blades of the first rotary impeller accurately. Therefore, during the rotation of the first rotary impeller, only a very small number of table tennis balls, or even no table tennis balls enter the space between two blades of the first rotary impeller, which will cause a waste of energy due to the idling of the first rotary impeller, and lead to long table tennis ball picking time and low picking success rate. To pick up all table tennis balls into the temporary ball storage bin, the first rotary impeller shall be rotated constantly or the position of the robot constantly shall be adjusted to change the position of the rotary impeller so that the table tennis balls fall within the rotation range of the first rotary impeller, which is a very tedious adjustment process and greatly reduces the picking success rate and picking efficiency.

SUMMARY OF THE INVENTION

The present invention intends to provide a ball picking robot which can solve the deficiencies in the prior art, and has the features of simple structure, convenient operation, high picking success rate, high picking efficiency and the like.

In order to achieve the above purpose, the technical solutions used in the present invention are as follows:

A ball picking robot comprises a walking mechanism, and a ball picking mechanism, a ball pushing mechanism and a ball storage mechanism mounted on the walking mechanism.

Specifically, the ball picking mechanism comprises a ball picking basket, an air cylinder used for driving the ball picking basket to move up and down, an air storage tank used for providing an air source for the air cylinder, a solenoid valve arranged at the air outlet of the air storage tank, a micro air pump connected to the air storage tank for discharging air outwards, and a shielding assembly arranged at an opening in the rear end of the ball picking basket. A first gear is mounted at the input end of the micro air pump.

The ball pushing mechanism comprises a rotary ball discharging assembly, comprising an either-rotation motor, a rotary impeller connected to a first output shaft of the either-rotation motor through a belt assembly, a second gear mounted on a second output shaft of the either-rotation motor, a gear drive shaft in meshing engagement with the second gear through a third gear installed at one end of the gear drive shaft, and a fourth gear mounted at the other end of the gear drive shaft and in meshing engagement with the first gear. The third gear and the fourth gear are mounted at two ends of the gear drive shaft, respectively.

Further, the micro air pump comprises an air inlet pipe, an air outlet pipe, a cylinder block and a high pressure chamber. The cylinder block comprises a compression chamber and a piston. The piston is connected to a piston connecting rod. The air inlet pipe is arranged on the piston. An air inlet valve for the compression chamber is arranged on the top of the piston. An air inlet valve for the high pressure chamber is arranged between the compression chamber and the high pressure chamber that is connected to the air outlet pipe. The piston connecting rod is the input end of the micro air pump, and the first gear is mounted on a first piston connecting rod.

Further, the walking mechanism comprises a frame, a plurality of wheel assemblies mounted on the frame, and a second drive assembly for driving the rotation of the wheel assemblies. The frame comprises an outer frame and an auxiliary member arranged within the outer frame. The frame is made of steel. The wheel assembly comprises a wheel, a wheel axle and a fifth gear sleeved on the wheel axle. Two ends of the wheel axle are fixed to the frame by a wheel axle bracket, and the wheel axle is in running fit with the wheel axle bracket through a bearing. The second drive assembly comprises a step motor mounted on the frame, a sixth gear mounted on the output shaft of the step motor, a walking drive shaft mounted on the frame, a seventh gear and an eighth gear arranged at two ends of the walking drive shaft respectively. The fifth gear engages with the seventh gear, and the sixth gear engages with the eighth gear. The walking drive shaft is mounted on the frame by means of a drive shaft bracket and is in running fit with the drive shaft bracket by means of a bearing. The step motor is mounted on the frame by means of a step motor bracket.

Further, the ball picking basket comprises a ball picking basket frame and a plurality of elastic cords staggered within the ball picking basket frame at intervals. A notch is arranged at the rear end of the ball picking basket frame; a cylinder connecting piece and a slider are arranged at the front thereof.

The air cylinder is mounted on the frame by means of a support frame. The support frame comprises a pair of longitudinal beams arranged in parallel, a crossbeam arranged between the top of the two longitudinal beams, a cylinder fixing slot embedded in the middle section of the crossbeam, a transverse support plate arranged between the middle sections of the two longitudinal beams, and a limit plate arranged between the lower ends of the two longitudinal beams. A guide rail is mounted at the rear side wall of the longitudinal beams and is in sliding fit with the slider.

The air cylinder penetrates and is installed in the cylinder fixing slot, the bottom of the air cylinder is supported by the transverse support plate, and the cylinder rod of the air cylinder passes through the transverse support plate and is connected to the cylinder connecting piece.

The air storage tank and the solenoid valve are mounted on a hanger plate that is mounted on the frame. The air inlet of the air storage tank is connected to the air outlet of the micro air pump.

The solenoid valve is a three-way solenoid valve, wherein the air inlet of the solenoid valve is connected to the air outlet of the air storage tank, a first air outlet thereof is connected to the air inlet of a first air chamber of the air cylinder, and a second air outlet thereof is connected to the air inlet of a second air chamber of the air cylinder.

The shielding assembly is of a tape structure and comprises a housing mounted at the bottom of the frame, an automatically retractable spring turntable mounted in the housing and a ruler wound on the spring turntable. The output end of the ruler is connected to the ball picking basket frame via a guide strut that is mounted at the bottom of the frame.

Further, the ball pushing mechanism comprises a ball discharging channel arranged at the rear side of the ball picking basket, a first ball pushing assembly for driving a ball on the ball picking basket to move backward to the ball discharging channel, a pushing assembly arranged at one end of the ball discharging channel for driving a ball in the ball discharging channel to move to the rotary ball discharging assembly, and a second ball pushing assembly for driving a ball in the ball storage mechanism to move backward. The rotary ball discharging assembly is arranged at the other end of the ball discharging channel for driving a ball to move into the ball storage mechanism.

The first ball pushing assembly comprises a first screw, a first motor for driving the rotation of the first screw, and a first push plate sleeved on the first screw and in screw-thread fit with the first screw. The first push plate is arranged above the ball picking basket. A ninth gear is mounted on the output shaft of the first motor, and a tenth gear in engagement with the ninth gear is mounted at the rear end of the first screw. The first motor is mounted on the frame by means of a first motor fixing bracket.

The either-rotation motor is mounted on the frame through an either-rotation motor fixing bracket. The rotary impeller is mounted on the frame through a first gantry frame and a second gantry frame. A rotary impeller shaft is mounted on the rotary impeller by penetrating through the middle thereof; two ends of the rotary impeller shaft are mounted on the first gantry frame and the second gantry frame and are in running fit with the first gantry frame and the second gantry frame through a bearing. The belt assembly comprises a first belt pulley connected to the first output shaft of the either-rotation motor, a second belt pulley sleeved on the outside of the outer end of the rotary impeller shaft, and a belt for driving the first belt pulley to be linked with the second belt pulley. The gear drive shaft is mounted on the frame by means of an arc-shaped bracket.

The second ball pushing assembly comprises a second screw, a second motor for driving the rotation of the second screw, and a second push plate sleeved on the second screw and in screw-thread fit with the second screw. The second push plate is arranged above the ball storage mechanism. An eleventh gear is mounted on the output shaft of the second motor; a twelfth gear and a thirteenth gear are mounted on the front and rear ends of the second screw; and the eleventh gear engages with the twelfth gear. The second motor is mounted on the frame by means of a second motor fixing bracket.

The pushing assembly comprises a rack, a push plate provided at the inner end of the rack, and a third motor for driving the movement of the rack. A fourteenth gear in engagement with the rack is mounted on the output shaft of the third motor. The rack is mounted on a rack table that is mounted on the frame.

A front baffle and a rear baffle are arranged at the front and rear sides of the first motor, the second motor and the third motor, respectively. A front end of the first screw is mounted on the support frame, and a rear end thereof passes through the front baffle and is connected to the first motor. A front end of the second screw passes through the rear baffle and is connected to the second motor. The front baffle is arranged at the rear side of the ball discharging channel.

Further, the ball storage mechanism comprises a ball storage cavity, and a cavity door assembly arranged at the opening at the rear end of the ball storage cavity. The ball storage cavity comprises a base plate arranged above the frame, a left baffle and a right baffle arranged above the left and right ends of the base plate, a support beam mounted above the rear ends of the left baffle and the right baffle, a first gear drive assembly mounted at the rear side of the support beam, a second gear drive assembly mounted above the support beam, a third gear drive assembly mounted on the right baffle, and a fourth gear drive assembly mounted on the right baffle. The base plate is arranged to have a slope from front to back. The cavity door assembly comprises a door body, a first connecting member movably attached between the left end of the door body and the left baffle, and a second connecting member movably attached between the right end of the door body and the right baffle. The first gear drive assembly comprises a fifteenth gear, a sixteenth gear and a seventeenth gear in meshing engagement therewith sequentially. The fifteenth gear engages with the thirteenth gear. The rear end of the second screw penetrates and is mounted on the support beam. The seventeenth gear is a cylindrical angular wheel comprising a plurality of teeth arranged on the outer circumference and the inner wall thereof. The second gear drive assembly comprises a first gear shaft mounted transversely above the support beam, an eighteenth gear and a nineteenth gear mounted at the left and right ends of the first gear shaft, respectively. The first gear shaft is mounted on the support beam through a first gear shaft bracket. The eighteenth gear engages with the inner wall of the seventeenth gear. The third gear drive assembly comprises a second gear shaft mounted longitudinally on the right baffle, a twentieth gear and a twenty-first gear mounted at the upper and lower ends of the second gear shaft respectively. The second gear shaft is mounted on the right baffle by means of a second gear shaft bracket, and the twentieth gear engages with the nineteenth gear. The fourth gear drive assembly comprises a third gear shaft that is mounted on the right baffle through transverse penetration of the right baffle, and a twenty-second gear mounted on the third gear shaft. The inner end of the third gear shaft is connected to the second connecting member, and the twenty-second gear engages with the twenty-first gear.

Compared with the prior art, the present invention has the following advantages:

(1) The robot can move automatically along a set route by a walking mechanism. It can also move in all directions and has a function of turning through the steering and speed adjustment of two sets of step motors, which improves the flexibility of the robot and enables it to move to all corners to pick up balls. Hence, the ball picking efficiency is improved and the labor intensity is reduced.

(2) By using a ball picking basket comprising a plurality of elastic cords (e.g. rubber bands) and a ball picking basket frame, it is possible that a ball can enter the ball picking basket from the gap surrounded by adjacent elastic cords when the ball picking basket is pressed on top of the ball. However, there will be a decline in elasticity of elastic cords (e.g. rubber bands) after long-term use. When such elastic cords are pressed against a ball, the ball will be deformed correspondingly and cannot be successfully locked into the ball picking basket composed of elastic cords, resulting in a decline in the ball picking efficiency; at the same time, the structure of the ball picking robot is too complex to replace the ball picking basket conveniently. Therefore, the present invention adopts an air cylinder for driving the ball picking basket to move downwards so that a downward instantaneous acting force can be applied to the ball picking basket for quickly and accurately picking up a ball, thereby reducing the wear and tear on elastic cords, slowing down the elastic falling speed of elastic cords and prolonging the service life of the ball picking basket. In addition, an either-rotation motor is used to drive the rotary impeller and the micro air pump at the same time, which reduces the number of motors in the whole robot and the weight of the whole robot, and improves the running reliability and stability. A three-way solenoid valve is used to control the air inlet of the air cylinder. In this case, only one air storage tank is to be provided for the air inlet of different air chambers of the air cylinder, thus achieving the up-and-down movement of the air cylinder. The present invention uses a shielding assembly of a tape structure. On the one hand, the ruler blocks the opening of the ball picking basket to prevent a ball from falling off from the ball picking basket; on the other hand, after the ball picking is completed, the ruler can be retracted to expose the opening of the ball picking basket and enable the ball to enter the ball discharging channel through the opening.

(3) The first ball pushing assembly is provided to push balls picked up in the ball picking basket into the ball discharging channel, so as to empty the ball picking basket in time and improve the ball picking efficiency. The pushing assembly is provided to push balls in the ball discharging channel to below the rotary ball discharging assembly. Because of the rotary ball discharging assembly, it is possible that a ball, when entering the gap between adjacent blades of the rotary impeller, can move backward into the ball storage mechanism through the rotating rotary impeller.

(4) The base plate of the ball storage mechanism is arranged to have a slope from front to back, so that a ball entering the ball storage mechanism will be able to move backward along the base plate having a slope rather than return back to the rotary ball discharging assembly. The first gear drive assembly, the second gear drive assembly, the third gear drive assembly and the fourth gear drive assembly are provided to open the door body when the second push plate pushes a ball in the ball storage mechanism backward. The first gear drive assembly comprising a plurality of gears and having a drive ratio is able to adjust the opening speed of the door body, and make the door body open completely when the second push plate moves backward to the end of the ball storage mechanism. Therefore, the second ball pushing assembly and the door body can be protected to a certain extent so that various components will not be damaged due to interfere with each other.

DETAILED DESCRIPTION OF THE PREFERRED EMBODIMENT

Figure 1:
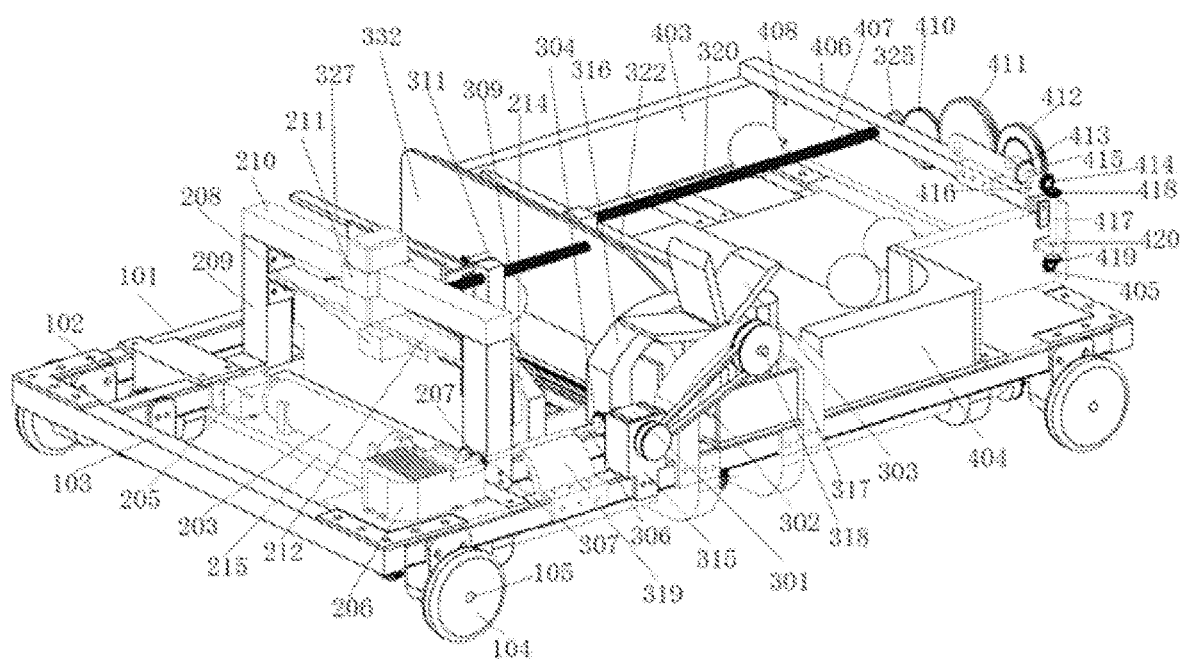
FIG. 1 is a structural diagram 1 of the present invention.
Figure 2:
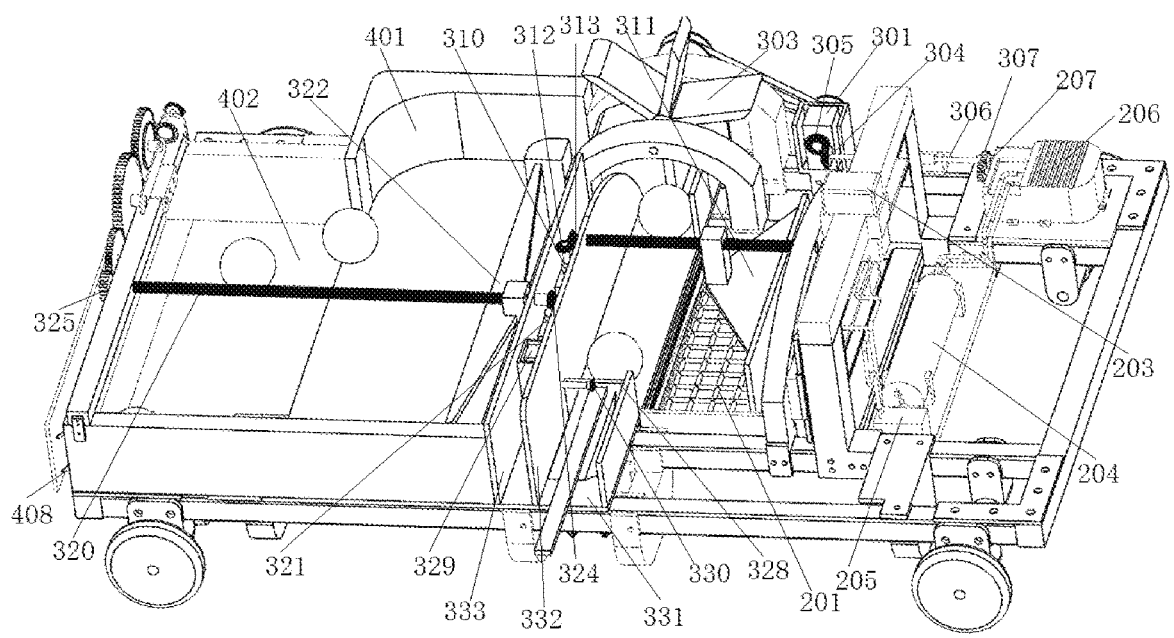
FIG. 2 is a structural diagram 2 of the present invention.
Figure 3:
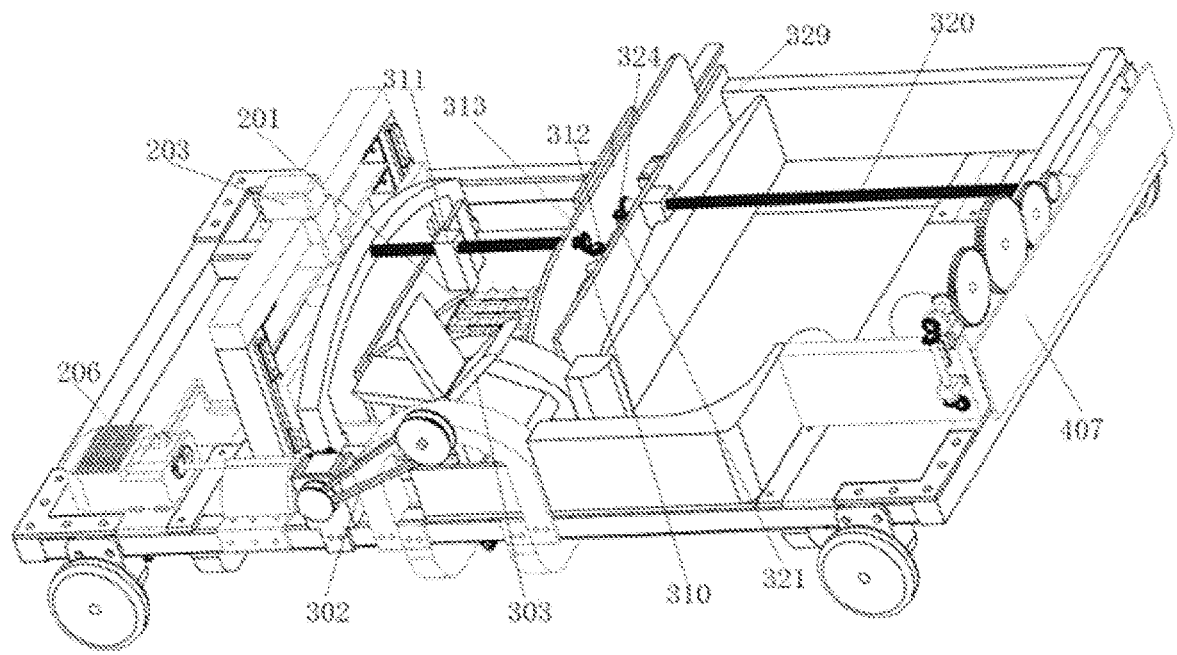
FIG. 3 is a structural diagram 3 of the present invention.
Figure 4:
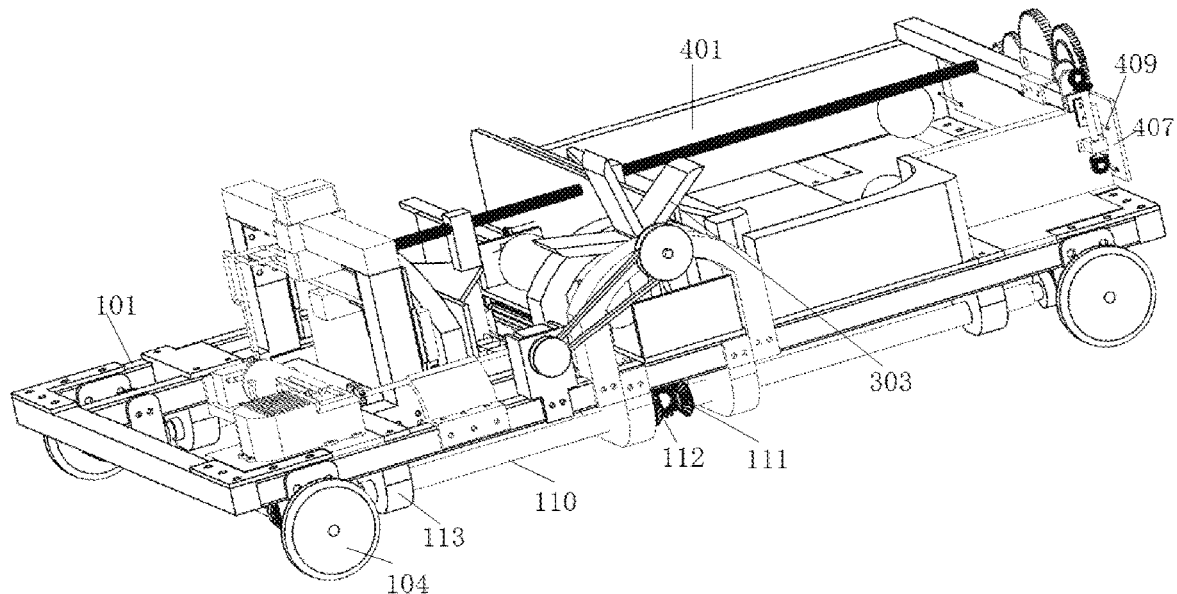
FIG. 4 is a structural diagram 4 of the present invention.

The present invention will be further explained with reference to the drawings.

As shown in FIGS. 1-6, a ball picking robot comprises a walking mechanism, and a ball picking mechanism, a ball pushing mechanism and a ball storage mechanism mounted on the walking mechanism.

The walking mechanism comprises a frame 101, a plurality of wheel assemblies mounted on the frame 101, and a second drive assembly for driving the rotation of the wheel assemblies. The frame 101 comprises an outer frame 102 and an auxiliary member 103 arranged within the outer frame 102. The frame 101 is made of steel, which improves the structural strength and provides solid support for other mechanisms. The wheel assembly comprises a wheel 104, a wheel axle 105 and a fifth gear sleeved on the wheel axle 105. Two ends of the wheel axle 105 are fixed to the frame 101 by a wheel axle bracket 107, and the wheel axle 105 is in running fit with the wheel axle bracket 107 through a bearing. The second drive assembly comprises a step motor 108 mounted on the frame 101, a sixth gear 109 mounted on the output shaft of the step motor 108, a walking drive shaft 110 mounted on the frame 101, a seventh gear 111 and an eighth gear 112 arranged at two ends of the walking drive shaft 110 respectively. The fifth gear engages with the seventh gear 111, and the sixth gear 109 engages with the eighth gear 112. The walking drive shaft 110 is mounted on the frame 101 by means of a drive shaft bracket 113 and is in running fit with the drive shaft bracket 113 by means of a bearing. The step motor 108 is mounted on the frame 101 by means of a step motor bracket 114.

Figure 5:
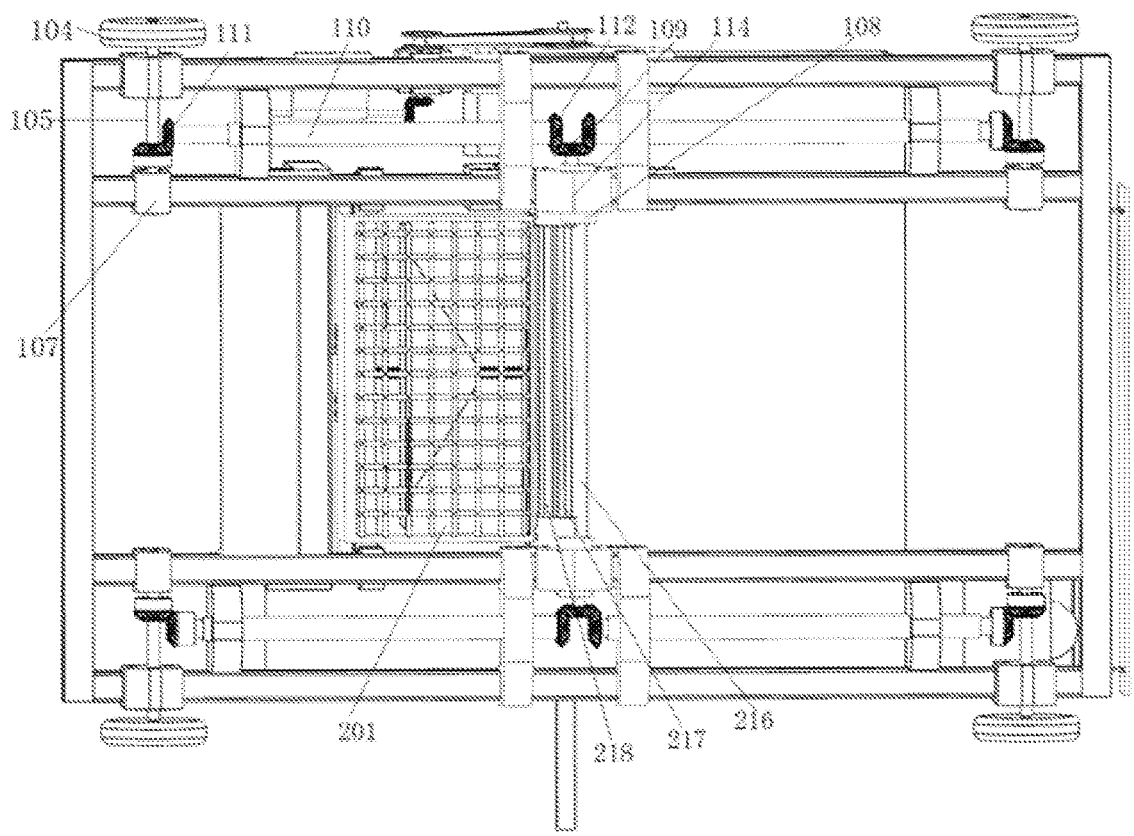
FIG. 5 is a bottom view of the present invention.
Figure 6:
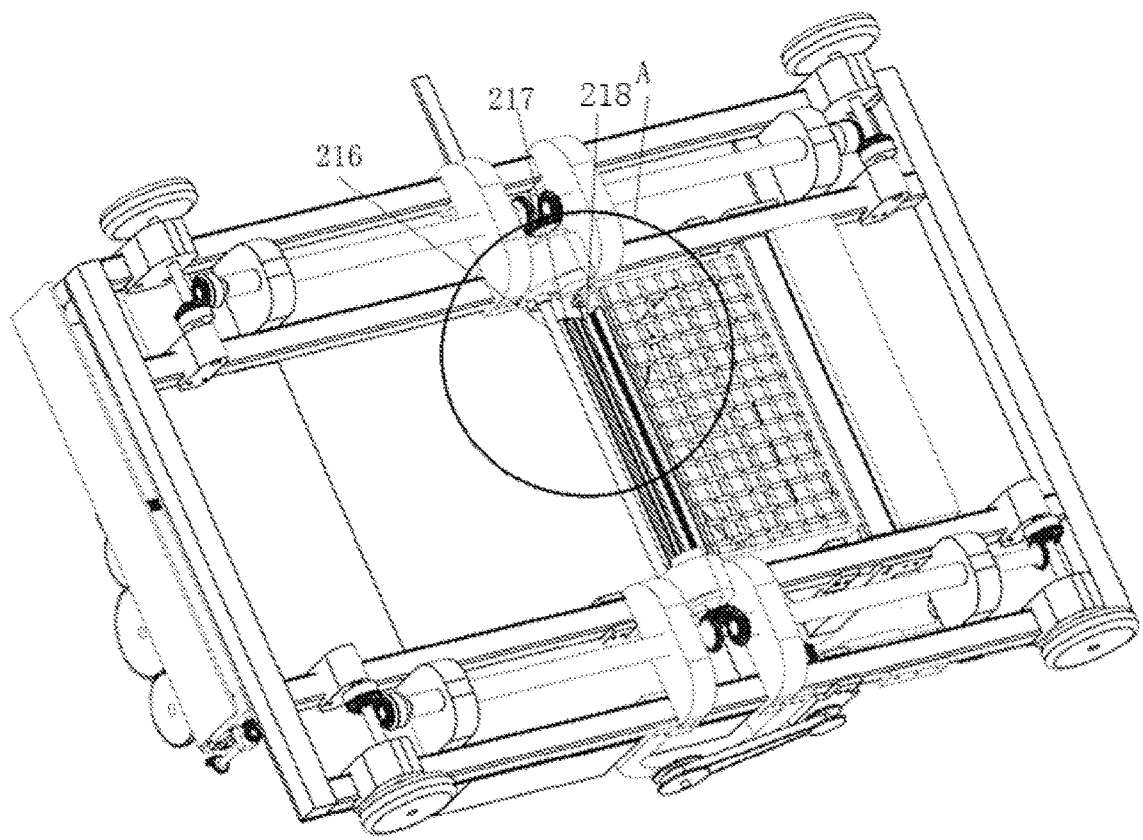
FIG. 6 is a structural diagram 5 of the present invention.

As shown in FIG. 5, two step motors 108 are symmetrically arranged to control the two wheels 104 at the left and the two wheels 104 at the right, respectively. Four walking drive shafts 110 are respectively arranged in one-to-one correspondence with the four wheels 104. The step motor 108 works to drive the rotation of the sixth gear 109, the eighth gear 112 in engagement with the sixth gear 109, and the walking drive shaft 110 fixedly connected to the eighth gear 112. Driven by the walking drive shaft 110, the seventh gear 111 arranged at the other end of the walking drive shaft 110 and the fifth gear in engagement with the seventh gear 111 will also rotate to drive the wheel axle 105 fixedly connected to the fifth gear, and the wheel 104 fixedly connected to the wheel axle 105, so as to finally achieve the walking motion of the robot. The robot can move automatically along a set route by a walking mechanism, which improves the ball picking efficiency and reduces the labor intensity. It can also move in all directions and has a function of turning through the steering and speed adjustment of two sets of step motors, which improves the flexibility of the robot and enables it to move to all corners to pick up balls. In this embodiment, the front, back, left and right sides are illustrated on the basis of FIG. 1.

Further, the ball picking mechanism comprises a ball picking basket 201, an air cylinder 203 used for driving the ball picking basket to move up and down, an air storage tank 204 used for providing an air source for the air cylinder, a solenoid valve 205 arranged at the air outlet of the air storage tank 204, a micro air pump 206 connected to the air storage tank, and a shielding assembly arranged at an opening in the rear end of the ball picking basket 201. A first gear 207 is mounted at the input end of the micro air pump 206.

The micro air pump 206 comprises an air inlet pipe, an air outlet pipe, a cylinder block and a high pressure chamber. The cylinder block comprises a compression chamber and a piston. The piston is connected to a piston connecting rod. The air inlet pipe is arranged on the piston. An air inlet valve for the compression chamber is arranged on the top of the piston. An air inlet valve for the high pressure chamber is arranged between the compression chamber and the high pressure chamber that is connected to the air outlet pipe. The piston connecting rod is the input end of the micro air pump, and the first gear 207 is mounted on a first piston connecting rod. The micro air pump 206 herein refers to a small micro air pump or FNY series, FKY series and D50 series micro air pump disclosed in Chinese patent CN204493111U. To reduce the number of motors and the weight of the robot, and improve the operational reliability of the robot, one motor that drives the movement of the piston connecting rod in the micro air pump and one motor that drives the movement of the rotary impeller are combined into one; that is, an either-rotation motor is used to achieve the movement of the piston connecting rod and the rotation of the rotary impeller in the micro air pump through the engagement of multiple gears and the cooperation of the belt assembly, thus achieving the air inlet and outlet of the micro air pump.

The ball picking basket 201 comprises a ball picking basket frame 202 and a plurality of elastic cords staggered within the ball picking basket frame 202 at intervals. A notch is arranged at the rear end of the ball picking basket frame 202; a cylinder connecting piece 208 and a slider are arranged at the front thereof. The elastic cords are rubber bands and other elastic materials. As shown in FIG. 5, a plurality of elastic cords staggered at intervals form a number of gaps, through which a ball is able to enter the ball picking basket 201 and from which the ball will not fall off when the ball picking basket 201 moves downward.

The air cylinder 203 is mounted on the frame 101 by means of a support frame. The support frame comprises a pair of longitudinal beams 209 arranged in parallel, a crossbeam 210 arranged between the top of the two longitudinal beams 209, a cylinder fixing slot 211 embedded in the middle section of the crossbeam 210, a transverse support plate 212 arranged between the middle sections of the two longitudinal beams 209, and a limit plate arranged between the lower ends of the two longitudinal beams 209. A guide rail 214 is mounted at the rear side wall of the longitudinal beams 209 and is in sliding fit with the slider. The cylinder rod of the air cylinder 203 moves up and down to drive the ball picking basket 201 to do the same movement. The limit plate is used to limit the movement stroke of the air cylinder 203. The guide rail 214 and the slider are used to limit the direction of movement of the ball picking basket 201 so that the ball picking basket 201 can move straight up and down, so as to prevent the ball picking basket from swaying, and ensure the ball picking accuracy and the ball picking efficiency.

The air cylinder 203 penetrates and is installed in the cylinder fixing slot 211, the bottom of the air cylinder 203 is supported by the transverse support plate 212, and the cylinder rod of the air cylinder 203 passes through the transverse support plate 212 and is connected to the cylinder connecting piece 208. The air cylinder 203 is fixedly installed in the cylinder fixing slot 211 and supported by the transverse support plate 212, so as to ensure the stability of the air cylinder and the movement stability of the ball picking basket.

The air storage tank 204 and the solenoid valve 205 are mounted on a hanger plate 215 that is mounted on the frame 101. The air inlet of the air storage tank 204 is connected to the air outlet of the micro air pump 206.

The air inlet and air outlet of the micro air pump 206 are connected to the air inlet and overflow port of the air storage tank 204 through a pipe, respectively. Excessive air pressure in the air storage tank 204 will be released through an overload valve. The other air outlet of the air storage tank 204 is used for discharging compressed air and connected to the air inlet of the solenoid valve through a pipe. The solenoid valve 205 is a three-way solenoid valve, wherein the air inlet of the solenoid valve is connected to the air outlet of the air storage tank 204, a first air outlet thereof is connected to the air inlet of a first air chamber of the air cylinder 203, and a second air outlet thereof is connected to the air inlet of a second air chamber of the air cylinder 203. Through the opening of different air outlet of the solenoid valve 205, the cylinder rod of the air cylinder 203 is controlled to move in different directions, thus achieving the rapid up-and-down movement of the ball picking basket.

Figure 7:
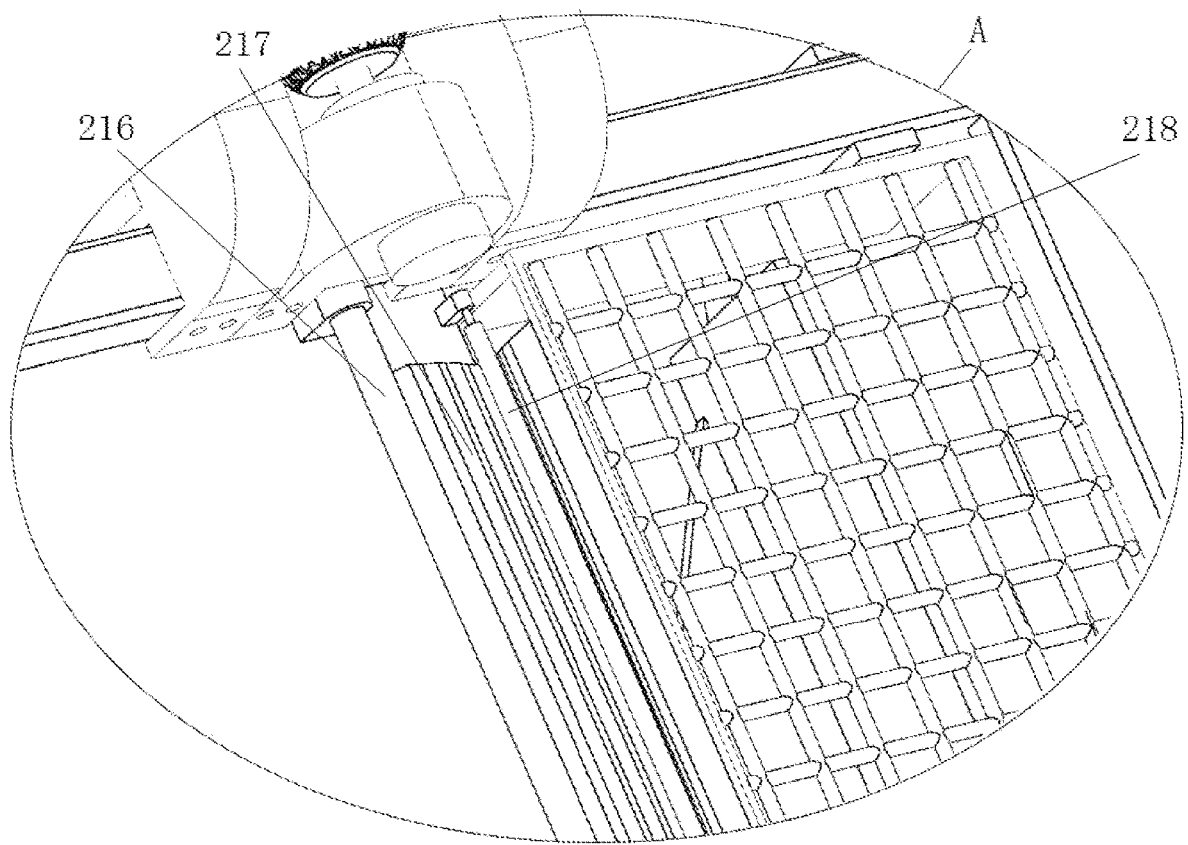
FIG. 7 is an enlarged view of part A in FIG. 6.
Wherein
101. frame, 102. outer frame, 103. auxiliary member, 104. wheel, 105. wheel axle, 107. wheel axle bracket, 108. step motor, 109. sixth gear, 110. walking drive shaft, 111. seventh gear, 112. eighth gear, 113. drive shaft bracket, 114. step motor bracket, 201. ball picking basket, 202. ball picking basket frame, 203. air cylinder, 204. air storage tank, 205. solenoid valve, 206. micro air pump, 207. first gear, 208. cylinder connecting piece, 209. longitudinal beam, 210. crossbeam, 211. cylinder fixing slot, 212. transverse support plate, 214. guide rail, 215. hanger plate, 216. housing, 217. ruler, 218. guide strut, 301. either-rotation motor, 302. belt assembly, 303. rotary impeller, 304. second gear, 305. third gear, 306. gear drive shaft, 307. fourth gear, 309. first screw, 310. first motor, 311. first push plate, 312. ninth gear, 313. tenth gear, 315. either-rotation motor fixing bracket, 316. first gantry frame, 317. second gantry frame, 318. rotary impeller shaft, 319. arc-shaped bracket, 320. second screw, 321. second motor, 322. second push plate, 324. twelfth gear, 325. thirteenth gear, 327. rack, 328. push plate, 401. ball storage cavity, 402. base plate, 403. left baffle, 404. right baffle, 405. twenty-second gear, 406. support beam, 407. door body, 408. first connecting member, 409. second connecting member, 410. fifteenth gear, 411. sixteenth gear, 412. seventeenth gear, 413. eighteenth gear, 414. nineteenth gear, 415. first gear shaft, 416. first gear shaft bracket, 417. second gear shaft, 418. twentieth gear, 419. twenty-first gear, 420. second gear shaft bracket, 421. third gear shaft.

As shown in FIG. 7, the shielding assembly is of a tape structure and comprises a housing 216 mounted at the bottom of the frame 101, an automatically retractable spring turntable mounted in the housing 216 and a ruler 217 wound on the spring turntable. The output end of the ruler 217 is connected to the ball picking basket frame 202 via a guide strut 218 that is mounted at the bottom of the frame 101. During the ball picking operation of the ball picking basket, that is, when the ball picking basket moves downward, the output end of the ruler 217 will move downward together with the ball picking basket to pull part of the ruler 217 outward. The guide strut 218 acts as a guide so that the part of ruler 217 being pulled out fits into and blocks the notch of the ball picking basket frame 202 to prevent a ball from falling out of the notch after entering into the ball picking basket 201. The ball picking basket 201 moves upward after the ball picking operation is completed. Then, the ruler 217 automatically retracts into the housing 216 under the action of the spring turntable, and the notch of the ball picking basket frame 202 is no longer blocked by the ruler 217. When there are a certain number of balls in the ball picking basket 201, they will be discharged into the ball discharging channel via the notch.

By using a ball picking basket comprising a plurality of elastic cords (e.g. rubber bands) and a ball picking basket frame 202, it is possible that a ball can enter the ball picking basket from the gap surrounded by adjacent elastic cords when the ball picking basket 201 is pressed on top of the ball. However, there will be a decline in elasticity of elastic cords (e.g. rubber bands) after long-term use. When such elastic cords are pressed against a ball, the ball will be deformed correspondingly and cannot be successfully locked into the ball picking basket composed of elastic cords 201, resulting in a decline in the ball picking efficiency; at the same time, the structure of the ball picking robot is too complex to replace the ball picking basket 201 conveniently. Therefore, the present invention adopts an air cylinder 203 for driving the ball picking basket 201 to move downwards so that a downward instantaneous acting force can be applied to the ball picking basket 201 for quickly and accurately picking up a ball, thereby reducing the wear and tear on elastic cords, slowing down the elastic falling speed of elastic cords and prolonging the service life of the ball picking basket 201. In addition, an either-rotation motor 301 is used to drive the rotary impeller 303 and the micro air pump 206 at the same time, which reduces the number of motors in the whole robot and the weight of the whole robot, and improves the running reliability and stability. In Chinese patent CN 11015226 A, all balls are brought into the temporary ball storage bin through the interworking of several parts such as a first rotary impeller, a ball collecting plate, a walking mechanism and other components, as well as through constantly adjusting the position of the first rotary impeller. The ball picking basket has a large area, allowing multiple balls to enter the ball picking basket at the same time via the gap between elastic cords when the ball picking basket moves downward, which greatly improves the ball picking efficiency. Moreover, the ball can be easily positioned below the ball picking basket, and various components are not required to cooperate with each other, which avoid the waste of energy, simplify the ball picking process and improve the ball picking success rate. A three-way solenoid valve 205 is used to control the air inlet of the air cylinder 203. In this case, only one air storage tank 204 is to be provided for the air inlet of different air chambers of the air cylinder 203, thus achieving the up-and-down movement of the air cylinder 203. The present invention uses a shielding assembly of a tape structure. On the one hand, the ruler 217 blocks the opening of the ball picking basket 201 to prevent a ball from falling off from the ball picking basket 201; on the other hand, after the ball picking is completed, the ruler 217 can be retracted to expose the opening of the ball picking basket 201 and enable the ball to enter the ball discharging channel through the opening.

Further, the ball pushing mechanism comprises a rotary ball discharging assembly, comprising an either-rotation motor 301, a rotary impeller 303 connected to a first output shaft of the either-rotation motor 301 through a belt assembly 302, a second gear 304 mounted on the second output shaft of the either-rotation, a gear drive shaft 306 in meshing engagement with the second gear 304 through a third gear 305 mounted at one end of the gear drive shaft, and a fourth gear 307 mounted at the other end of the gear drive shaft 306 and in meshing engagement with the first gear 207. When the either-rotation motor 301 works, the second output shaft of the either-rotation motor 301 will rotate to drive the second gear 304, the third gear 305 in meshing engagement with the second gear 304, and the gear drive shaft 306 fixedly connected to the third gear 305. The rotation of the gear drive shaft 306 can drive the fourth gear 307 fixedly connected to the gear drive shaft 306, and the first gear 207 in meshing engagement with the fourth gear 304, so as to enable the piston connecting rod of the micro air pump 206 to move and the micro air pump 206 to work, discharging the gas in the gas storage tank 204 into the air cylinder 203.

The ball pushing mechanism further comprises a ball discharging channel arranged at the rear side of the ball picking basket 201, a first ball pushing assembly for driving a ball on the ball picking basket 201 to move backward to the ball discharging channel, a pushing assembly arranged at one end of the ball discharging channel for driving a ball in the ball discharging channel to move to the rotary ball discharging assembly, and a second ball pushing assembly for driving a ball in the ball storage mechanism to move backward. The rotary ball discharging assembly is arranged at the other end of the ball discharging channel for driving a ball to move into the ball storage mechanism.

The first ball pushing assembly comprises a first screw 309, a first motor 310 for driving the rotation of the first screw 309, and a first push plate 311 sleeved on the first screw 309 and in screw-thread fit with the first screw 309. The first push plate 311 is arranged above the ball picking basket 201. A ninth gear 312 is mounted on the output shaft of the first motor 310, and a tenth gear 313 in engagement with the ninth gear 312 is mounted at the rear end of the first screw 309. The first motor 310 is mounted on the frame 101 by means of a first motor fixing bracket.

The either-rotation motor 301 is mounted on the frame 101 through an either-rotation motor fixing bracket. The rotary impeller 303 is mounted on the frame 101 through a first gantry frame 316 and a second gantry frame 317. A rotary impeller shaft 318 is mounted on the rotary impeller 303 by penetrating through the middle thereof; two ends of the rotary impeller shaft 318 are mounted on the first gantry frame 316 and the second gantry frame 317 and are in running fit with the first gantry frame 316 and the second gantry frame 317 through a bearing. The belt assembly 302 comprises a first belt pulley connected to the first output shaft of the either-rotation motor 301, a second belt pulley sleeved on the outside of the outer end of the rotary impeller shaft 318, and a belt for driving the first belt pulley to be linked with the second belt pulley. The gear drive shaft 306 is mounted on the frame 101 by means of an arc-shaped bracket 319. The rotatory impeller 303 comprises a fixed seat and a plurality of blades evenly distributed along the periphery of the fixed seat. The rotary impeller shaft 318 is in running fit with the fixed seat by passing through the middle of the fixed seat.

The pushing assembly comprises a rack 327, a push plate 328 provided at the inner end of the rack 327, and a third motor 329 for driving the movement of the rack 327. A fourteenth gear 330 in engagement with the rack 327 is mounted on the output shaft of the third motor 329. The rack 330 is mounted on a rack table 331 that is mounted on the frame 101.

The second ball pushing assembly comprises a second screw 320, a second motor 321 for driving the rotation of the second screw 320, and a second push plate 322 sleeved on the second screw 320 and in screw-thread fit with the second screw 320. The second push plate 322 is arranged above the ball storage mechanism. An eleventh gear is mounted on the output shaft of the second motor 321, a twelfth gear 324 and a thirteenth gear 325 are mounted on the front and rear ends of the second screw 320, and the eleventh gear engages with the twelfth gear 324. The second motor 321 is mounted on the frame 101 by means of a second motor fixing bracket.

A front baffle 332 and a rear baffle 333 are arranged at the front and rear sides of the first motor 310, the second motor 321 and the third motor 329, respectively. A front end of the first screw 309 is mounted on the support frame, and a rear end thereof passes through the front baffle 332 and is connected to the first motor 310. A front end of the second screw 320 passes through the rear baffle 333 and is connected to the second motor 321. The front baffle 332 is arranged at the rear side of the ball discharging channel. The front baffle 332 and the rear baffle 333 have a protective effect on the first motor 310, the second motor 321 and the third motor 329; and the rear baffle blocks the front side of the ball storage cavity 401. The one end of the rear baffle 333 located at the rotary impeller 303 is provided with an opening as the entrance of the ball storage cavity 401.

After the ball picking is completed, the ball picking basket 201 moves up to the original position. The first motor 310 works to drive the ninth gear 312, the tenth gear 313 in engagement with the ninth gear 312, and the first screw 309 fixedly connected to the tenth gear 313; as a result, the first push plate 311 in screw-thread fit with the first screw 309 is forced to push balls in the ball picking basket 201 backward until they enter the ball discharging channel. At this time, the first push plate 311 and the front baffle 332 block the front and rear sides of the ball discharging channel to play a role in limiting the position. The third motor 329 works to rotate the fourteenth gear 330, which drives the rack 327 in engagement with the fourteenth gear 330, and forces the push plate 328 to push balls in the ball discharging channel to move in the direction of the rotary impeller 303 until they reach the rotary impeller 303 sequentially. At the same time, the either-rotation motor 301 works to drive the movement of the first belt pulley, the second belt pulley moves through the belt, and the rotary impeller shaft 318 connected to the second belt pulley rotates together with the second belt pulley. The rotary impeller shaft 318 rotates to drive the rotary impeller 303. When a ball reaching the rotary impeller 303 under the action of the pushing component enters the gap between two adjacent blades of the rotary impeller 303, the rotating rotary impeller 303 will drive the ball to the entrance of the ball storage cavity 401 and bring it into the ball storage cavity 401. The rotary impeller is equipped with a sensor capable of counting the number of balls. After all balls in the ball discharging channel enter the ball storage cavity 401, the first motor 310 reverses to make the first push plate 311 return to the front side of the ball picking basket 201. The third motor 329 reverses to return the push plate 328 to the initial position. The second motor 321 starts to rotate the eleventh gear and the twelfth gear 324 in engagement with the eleventh gear, which drives the second screw 320 fixedly connected to the twelfth gear 324; as a result, the second push plate 322 in screw-thread fit with the second screw 320 moves backward, causing the ball in the ball storage cavity 401 to move backward. The first ball pushing assembly is provided to push balls picked up in the ball picking basket 201 into the ball discharging channel, so as to empty the ball picking basket 201 in time and improve the ball picking efficiency. The pushing assembly is provided to push balls in the ball discharging channel to below the rotary ball discharging assembly. Because of the rotary ball discharging assembly, it is possible that a ball, when entering the gap between adjacent blades of the rotary impeller 303, can move backward into the ball storage mechanism through the rotating rotary impeller 303.

Further, the ball storage mechanism comprises a ball storage cavity 401, and a cavity door assembly arranged at the opening at the rear end of the ball storage cavity 401. The ball storage cavity comprises a base plate 402 arranged above the frame 101, a left baffle 403 and a right baffle 404 arranged above the left and right ends of the base plate 402, a support beam 406 mounted above the rear ends of the left baffle 403 and the right baffle 404, a first gear drive assembly mounted at the rear side of the support beam 406, a second gear drive assembly mounted above the support beam 406, a third gear drive assembly mounted on the right baffle 404, and a fourth gear drive assembly mounted on the right baffle 404. The top of the base plate 402 is arranged to have a slope from front to back. The cavity door assembly comprises a door body 407, a first connecting member 408 movably attached between the left end of the door body 407 and the left baffle 403, and a second connecting member 409 movably attached between the right end of the door body 407 and the right baffle 404. The first gear drive assembly comprises a fifteenth gear 410, a sixteenth gear 411 and a seventeenth gear 412 in meshing engagement therewith sequentially. The fifteenth gear 410 engages with the thirteenth gear 325. The rear end of the second screw 320 penetrates and is mounted on the support beam 406. The seventeenth gear 412 is a cylindrical angular wheel comprising a plurality of teeth arranged on the outer circumference and the inner wall thereof. The second gear drive assembly comprises a first gear shaft 415 mounted transversely above the support beam 406, an eighteenth gear 413 and a nineteenth gear 414 mounted at the left and right ends of the first gear shaft 415, respectively. The first gear shaft 415 is mounted on the support beam 406 through a first gear shaft bracket 416. The eighteenth gear 413 engages with the inner wall of the seventeenth gear 412. The third gear drive assembly comprises a second gear shaft 417 mounted longitudinally on the right baffle 404, a twentieth gear 418 and a twenty-first gear 419 mounted at the upper and lower ends of the second gear shaft 417 respectively. The second gear shaft 417 is mounted on the right baffle 404 by means of a second gear shaft bracket 420, and the twentieth gear 418 engages with the nineteenth gear 414. The fourth gear drive assembly comprises a third gear shaft 421 that is mounted on the right baffle 404 through transverse penetration of the right baffle, and a twenty-second gear 405 mounted on the third gear shaft 421. The inner end of the third gear shaft 421 is connected to the second connecting member 409, and the twenty-second gear 405 engages with the twenty-first gear 419.

During the rotation of the second screw 320, the thirteenth gear 325 is driven to rotate with the second screw 320, which drive the fifteenth gear 410 in engagement with the thirteenth gear 325, the sixteenth gear 411 in engagement with the fifteenth gear 410, the seventeenth gear 412 in engagement with the sixteenth gear 411, the eighteenth gear 413 in engagement with the seventeenth gear 412, the first gear shaft 415 fixedly connected to the eighteenth gear 413, the nineteenth gear 414 fixedly connected to the first gear shaft 415, the twentieth gear 418 in engagement with the nineteenth gear 414, the second gear shaft 417 fixedly connected to the twentieth gear 418, the twenty-first gear 419 fixedly connected to the second gear shaft 417, the twenty-second gear 405 in engagement with the twenty-first gear 419, the third gear shaft 421 fixedly connected to the twenty-second gear 405 sequentially. The third gear shaft 421 is fixedly connected to the second connecting member 409, so as to move the second connecting member 409. Since the second connecting member 409 is connected to the door body 407, the movement of the second connecting member will cause the door body 407 to open and discharge balls in the ball storage cavity 401 outward, and then workers can collect them. When all the balls in the ball storage cavity are discharged, the second motor 321 reverses to return the second push plate 322 to the front side of the ball storage cavity 401, and the door 407 closes. The top of the base plate 402 of the ball storage mechanism is arranged to have a slope from front to back, so that a ball entering the ball storage mechanism will be able to move backward along the base plate 402 having a slope rather than return back to the rotary ball discharging assembly. The first gear drive assembly, the second gear drive assembly, the third gear drive assembly and the fourth gear drive assembly are provided to open the door body 407 when the second push plate 322 pushes a ball in the ball storage mechanism backward. The first gear drive assembly comprising a plurality of gears and having a drive ratio is able to adjust the opening speed of the door body 407, and make the door body 407 open completely when the second push plate 322 moves backward to the end of the ball storage mechanism. Therefore, the second ball pushing assembly and the door body 407 can be protected to a certain extent so that various components will not be damaged due to interfere with each other. After the four gear drive assemblies are removed, the door body can be set to open manually, which is simpler and easier to operate.

The preferred embodiments described herein are only for illustration purpose, and are not intended to limit the present invention. Various modifications and improvements on the technical solution of the present invention made by those of ordinary skill in the art without departing from the design spirit of the present invention shall fall within the protection scope as claimed in claims of the present invention.

What is claimed is:

1. A ball picking robot, characterized by comprising a walking mechanism, and a ball picking mechanism, a ball pushing mechanism and a ball storage mechanism mounted on the walking mechanism; wherein
the ball picking mechanism comprises a ball picking basket (201), an air cylinder (203) used for driving the ball picking basket to move up and down, an air storage tank (204) used for providing an air source for the air cylinder, a solenoid valve (205) arranged at an air outlet of the air storage tank (204), a micro air pump (206) connected to the air storage tank and a shielding assembly arranged at an opening in a rear end of the ball picking basket (201); a first gear (207) is mounted at an input end of the micro air pump (206);
the ball pushing mechanism comprises a rotary ball discharging assembly, comprising an either-rotation motor (301), a rotary impeller (303) connected to a first output shaft of the either-rotation motor (301) through a belt assembly (302), a second gear (304) mounted on a second output shaft of the either-rotation (301), a gear drive shaft (306) in meshing engagement with the second gear (304) through a third gear (305) mounted at one end of the gear drive shaft, and a fourth gear (307) mounted at the other end of the gear drive shaft (306) and in meshing engagement with the first gear (207).

2. The ball picking robot according to claim 1, characterized in that the micro air pump (206) comprises an air inlet pipe, an air outlet pipe, a cylinder block and a high pressure chamber, the cylinder block comprises a compression chamber and a piston, the piston is connected to a piston connecting rod, the air inlet pipe is arranged on the piston, an air inlet valve for the compression chamber is arranged on the top of the piston, an air inlet valve for the high pressure chamber is arranged between the compression chamber and the high pressure chamber that is connected to the air outlet pipe, the piston connecting rod is the input end of the micro air pump (206), and the first gear (207) is mounted on a first piston connecting rod.

3. The ball picking robot according to claim 1, characterized in that the walking mechanism comprises a frame (101), a plurality of wheel assemblies mounted on the frame (101), and a second drive assembly for driving a rotation of the wheel assemblies; the frame (101) comprises an outer frame (102) and an auxiliary member (103) arranged within the outer frame (102); the frame (101) is made of steel; the wheel assembly comprises a wheel (104), a wheel axle (105) and a fifth gear sleeved on the wheel axle (105); two ends of the wheel axle (105) are fixed to the frame (101) by a wheel axle bracket (107), and the wheel axle (105) is in running fit with the wheel axle bracket (107) through a bearing; the second drive assembly comprises a step motor (108) mounted on the frame (101), a sixth gear (109) mounted on an output shaft of the step motor (108), a walking drive shaft (110) mounted on the frame (101), a seventh gear (111) and an eighth gear (112) arranged at two ends of the walking drive shaft (110) respectively; the fifth gear engages with the seventh gear (111), and the sixth gear (109) engages with the eighth gear (112); the walking drive shaft (110) is mounted on the frame (101) by means of a drive shaft bracket (113) and is in running fit with the drive shaft bracket (113) by means of a bearing; and the step motor (108) is mounted on the frame (101) by means of a step motor bracket (114).

4. The ball picking robot according to claim 3, characterized in that the ball picking basket (201) comprises a ball picking basket frame (202) and a plurality of elastic cords staggered within the ball picking basket frame (202) at intervals; a notch is arranged at a rear end of the ball picking basket frame (202); a cylinder connecting piece (208) and a slider are arranged at the front thereof;
the air cylinder (203) is mounted on the frame (101) by means of a support frame; the support frame comprises a pair of longitudinal beams (209) arranged in parallel, a crossbeam (210) arranged between the top of the two longitudinal beams (209), a cylinder fixing slot (211) embedded in a middle section of the crossbeam (210), a transverse support plate (212) arranged between middle sections of the two longitudinal beams (209), and a limit plate arranged between the lower ends of the two longitudinal beams (209); a guide rail (214) is mounted at the rear side wall of the longitudinal beams (209) and is in sliding fit with the slider;
the air cylinder (203) penetrates and is installed in the cylinder fixing slot (211), the bottom of the air cylinder (203) is supported by the transverse support plate (212), and a cylinder rod of the air cylinder (203)

passes through the transverse support plate (212) and is connected to the cylinder connecting piece (208);

the air storage tank (204) and the solenoid valve (205) are mounted on a hanger plate (215) that is mounted on the frame (101); and an air inlet of the air storage tank (204) is connected to an air outlet of the micro air pump (206);

the solenoid valve (205) is a three-way solenoid valve, wherein an air inlet of the solenoid valve is connected to the air outlet of the air storage tank (204), a first air outlet thereof is connected to an air inlet of a first air chamber of the air cylinder (203), and a second air outlet thereof is connected to an air inlet of a second air chamber of the air cylinder (203);

the shielding assembly is of a tape structure and comprises a housing (216) mounted at the bottom of the frame (101), an automatically retractable spring turntable mounted in the housing (216) and a ruler (217) wound on the spring turntable; and an output end of the ruler (217) is connected to the ball picking basket frame (202) via a guide strut (218) that is mounted at the bottom of the frame (101).

5. The ball picking robot according to claim 4, characterized in that the ball pushing mechanism further comprises a ball discharging channel arranged at the rear side of the ball picking basket (201), a first ball pushing assembly for driving a ball on the ball picking basket to move backward to the ball discharging channel, a pushing assembly arranged at one end of the ball discharging channel for driving a ball in the ball discharging channel to move to the rotary ball discharging assembly, and a second ball pushing assembly for driving a ball in the ball storage mechanism to move backward; and the rotary ball discharging assembly is arranged at the other end of the ball discharging channel for driving a ball to move into the ball storage mechanism;

the first ball pushing assembly comprises a first screw (309), a first motor (310) for driving the rotation of the first screw, and a first push plate (311) sleeved on the first screw (309) and in screw-thread fit with the first screw (309); the first push plate (311) is arranged above the ball picking basket (201); a ninth gear (312) is mounted on an output shaft of the first motor (310), and a tenth gear (313) in engagement with the ninth gear (312) is mounted at a rear end of the first screw (309); and the first motor (310) is mounted on the frame (101) by means of a first motor fixing bracket;

the either-rotation motor (301) is mounted on the frame (101) through an either-rotation motor fixing bracket (315); the rotary impeller (303) is mounted on the frame (101) through a first gantry frame (316) and a second gantry frame (317); a rotary impeller shaft (318) is mounted on the rotary impeller (303) by penetrating through the middle thereof; two ends of the rotary impeller shaft (318) are mounted on the first gantry frame (316) and the second gantry frame (317) and are in running fit with the first gantry frame (316) and the second gantry frame (317) through a bearing; the belt assembly (302) comprises a first belt pulley connected to the first output shaft of the either-rotation motor (301), a second belt pulley sleeved on the outside of the outer end of the rotary impeller shaft (318), and a belt for driving the first belt pulley to be linked with the second belt pulley; and the gear drive shaft (306) is mounted on the frame (101) by means of an arc-shaped bracket (319);

the second ball pushing assembly comprises a second screw (320), a second motor (321) for driving the rotation of the second screw (320), and a second push plate (322) sleeved on the second screw (320) and in screw-thread fit with the second screw (320); the second push plate (322) is arranged above the ball storage mechanism; an eleventh gear is mounted on an output shaft of the second motor (321), a twelfth gear (324) and a thirteenth gear (325) are mounted on the front and rear ends of the second screw (320), and the eleventh gear is in engagement with the twelfth gear (324); and the second motor (321) is mounted on the frame (101) by means of a second motor fixing bracket;

the pushing assembly comprises a rack (327), a push plate (328) provided at the inner end of the rack (327), and a third motor (329) for driving the movement of the rack; a fourteenth gear (330) in engagement with the rack (327) is mounted on an output shaft of the third motor (329); and the rack (327) is mounted on a rack table (331) that is mounted on the frame (101);

a front baffle (332) and a rear baffle (333) are arranged at the front and rear sides of the first motor (310), the second motor (321) and the third motor (329), respectively; a front end of the first screw (309) is mounted on the support frame, and a rear end thereof passes through the front baffle (332) and is connected to the first motor (310); a front end of the second screw (320) passes through the rear baffle (333) and is connected to the second motor (321); and the front baffle (332) is arranged at the rear side of the ball discharging channel.

6. The ball picking robot according to claim 5, characterized in that the ball storage mechanism comprises a ball storage cavity (401), and a cavity door assembly arranged at an opening at a rear end of the ball storage cavity (401); the ball storage cavity comprises a base plate (402) arranged above the frame (101), a left baffle (403) and a right baffle (404) arranged above the left and right ends of the base plate (402), a support beam (406) mounted above rear ends of the left baffle (403) and the right baffle (404), a first gear drive assembly mounted at the rear side of the support beam (406), a second gear drive assembly mounted above the support beam (406), a third gear drive assembly mounted on the right baffle (404), and a fourth gear drive assembly mounted on the right baffle (404); the top of the base plate (402) is arranged to have a slope from front to back; the cavity door assembly comprises a door body (407), a first connecting member (408) movably attached between the left end of the door body (407) and the left baffle (403), and a second connecting member (409) movably attached between the right end of the door body (407) and the right baffle (404); the first gear drive assembly comprises a fifteenth gear (410), a sixteenth gear (411) and a seventeenth gear (412) in meshing engagement therewith sequentially; the fifteenth gear (410) engages with the thirteenth gear (325); the rear end of the second screw (320) penetrates and is mounted on the support beam (406); the seventeenth gear (412) is a cylindrical angular wheel comprising a plurality of teeth arranged on the outer circumference and the inner wall thereof; the second gear drive assembly comprises a first gear shaft (415) mounted transversely above the support beam (406), an eighteenth gear (413) and a nineteenth gear (414) mounted at the left and right ends of the first gear shaft (415), respectively; the first gear shaft (415) is mounted on the support beam (406) through a first gear shaft bracket (416); the eighteenth gear (413) engages with the inner wall of the seventeenth gear (412); the third gear drive assembly comprises a second gear shaft (417) mounted longitudinally on the right baffle (404), a twentieth gear (418) and a twenty-first gear (419) mounted at the upper and lower ends of the second gear shaft (417) respectively; the second gear shaft (417) is mounted on the right baffle (404) by means of a second gear shaft bracket (420), and the twentieth gear (418) engages with the nineteenth gear (414); the fourth gear drive assembly comprises a third gear shaft (421) that is mounted on the right baffle (404) through transverse penetration of the right baffle, and a twenty-second gear (405) mounted on the third gear shaft (421); the inner end of the third gear shaft (421) is connected to the second connecting member (409); and the twenty-second gear (405) engages with the twenty-first gear (419).

\* \* \* \* \*